United States Patent [19]

Iwamoto

[11] Patent Number: 5,126,423
[45] Date of Patent: Jun. 30, 1992

[54] COMPOSITION OF POLYEPOXIDE AND POLYISOCYANATE WITH ORGANOTIN, ZINC OR LITHIUM HALIDE COMPLEX CATALYST

[75] Inventor: Norikazu Iwamoto, Hyogo, Japan

[73] Assignee: Nippon Paint Co., Ltd., Osaka, Japan

[21] Appl. No.: 353,324

[22] Filed: May 15, 1989

[30] Foreign Application Priority Data

May 13, 1988 [JP] Japan .................................. 63-116190
May 13, 1988 [JP] Japan .................................. 63-116191

[51] Int. Cl.$^5$ ...................... C08G 18/00; C08G 18/22; C08G 18/24
[52] U.S. Cl. ........................................ 528/45; 528/51; 528/52; 528/55; 528/58; 525/528
[58] Field of Search ................... 525/528; 528/51, 52, 528/55, 58, 45

[56] References Cited

U.S. PATENT DOCUMENTS

| | | | |
|---|---|---|---|
| 3,702,839 | 11/1972 | Glasgow et al. | 528/51 |
| 3,767,624 | 10/1973 | Clarke | 523/415 |
| 3,979,365 | 9/1976 | Tanaka et al. | 525/528 |
| 4,022,721 | 5/1977 | Ashida | 528/55 |
| 4,118,373 | 10/1978 | Orvik | 528/51 |
| 4,128,531 | 12/1978 | Toyoda et al. | 528/55 |
| 4,424,316 | 1/1984 | DiSalvo et al. | 525/528 |
| 4,658,007 | 4/1987 | Marks et al. | 528/55 |

Primary Examiner—Melvyn I. Marquis
Assistant Examiner—Robert E. L. Sellers, II
Attorney, Agent, or Firm—Wenderoth, Lind & Ponack

[57] ABSTRACT

A thermosetting resinous composition which consists essentially of
(A) at least one polyepoxide compound having 2 to 6 epoxide groups,
(B) at least one polyisocyanate compound having 2 to 6 isocyanate or blocked isocyanate groups, and
(C) at least one catalyst selected from the group consisting of complex of organotinhalide with onium salt, complex of organotinhalide with hexamethylphosphoramide, complex of stibonium salt with zinc halide and complex of lithium halide with hexamethylphosphoramide, the equivalent ratio of isocyanate group and epoxide group being 1:2 to 2:1.

Such resinous composition is useful for forming a cured coating and also for heat resisting molded products.

2 Claims, No Drawings

COMPOSITION OF POLYEPOXIDE AND POLYISOCYANATE WITH ORGANOTIN, ZINC OR LITHIUM HALIDE COMPLEX CATALYST

FIELD OF INVENTION

The present invention relates to a thermosetting resinous composition comprising polyisocyanate compound, polyepoxy compound and catalyst and to a method for preparing a heat resisting cured coating and molded product using said composition.

BACKGROUND OF THE INVENTION

A thermosetting resin is widely used as injection molding, dipping, laminating or molding material in the preparation of various resin products such as electric insulating materials, construction materials, coating compositions, adhesives and the like. Recently, these products are often used under very severe conditions, and with the change in such use conditions, far improved properties and especially heat resisting property, are required of such thermosetting resin.

Since a plastic material having both isocyanurate and oxazolidone group was reported in German Patent Publication (unexamined) 3,223,153, special attention has been directed to this heat resisting novel resin. Such resin is usually prepared by the reaction of polyepoxide compound and polyisocyanate compound and sometimes referred to as polyoxazolidone resin because of having an oxazolidone ring formed by the reaction of epoxy group and isocyanate group. This oxazolidone ring forming reaction is usually carried out in the absence of catalyst at comparatively higher temperatures or in the presence of catalyst at a moderate temperature. Typical catalysts used are tertiary amines (e.g. imidazole, hexamethylenetetramine and the like), quaternary ammonium salts (e.g. iodotetraethylammonium and the like), complex of Lewis acid with base material (e.g. complex of aluminium chloride with pyrrolidone, complex of aluminium chloride with phosphoric ester and the like), lithium halide, complex of lithium halide with phosphor compound (e.g. complex of lithium bromide with tributyl phosphine oxide and the like) alkyl esters of organophosphone acid or phosphoric acid, ammonium salts of acidic esters of organophosphone acid or phosphoric acid and the like. Recently, Matuda et al proposed in J. Org. Chem. 51, (12), 2177–2184 (1986), Chemistry Letters, 1963–1966 (1986) organotin halide-Lewis base complexes and organostibonium halides as novel catalysts for effecting oxazolidone ring formation.

In the case of reaction between monoepoxide and monoisocyanate compounds, the desired oxazolidone compounds may be obtained by using such catalysts and adopting higher temperatures and longer reaction times. However, in the reactions between polyepoxide compounds and polyisocyanate compounds, the situations are more complicated and many by-products are produced together with oxazolidone compounds.

Among them, the main by-products are isocyanurate formed by trimerization of isocyanates and polyether formed by homopolymerization of epoxides. Once the trimerization of isocyanates occurs, there results materials with extremely higher functionalities which give highly crosslinked, brittle polymer. Therefore in the reactions between polyepoxide compounds and polyisocyanate compounds, it is essential that the trimerization reaction be controlled by all means. However, most of the heretofore proposed catalysts are effective not only for the formation of oxazolidone structure but also for the isocyanurate formation reaction, and polyoxazolidone products obtained by the known methods include 30 mole % or more of by-produced isocyanurates.

When a cured coating is prepared by using a composition comprising polyepoxide and polyisocyanate compounds, thus formed coating is mostly composed of the resins crosslinked with isocyanurate, urea bondings and polyoxazolidone crosslinkings are very few. This may be due to the fact that since various reactions are forced to occur in a very thin layer of the applied composition, they are liable to be affected by the action of moisture in surrounding air, causing hydrolysis of isocyanate groups and inactivation of catalyst used. Therefore, some measure has to be taken in obtaining a cured coating mainly of the resin crosslinked with oxazolidone ring bridge by using a resinous composition comprising polyepoxide and polyisocyanate.

In the case of molded products, the abovementioned moisture effect is not so important. However, with the increase in epoxide content, there occurs severe exothermic reactions, resulting in undesired scorching of the molded product. Such thermal degradation is pointed out as one of the questions still awaiting a good solution for molding use of the abovesaid composition. In such application, some measure has to be taken to react polyepoxide and polyisocyanate under mild condition to give polyoxazolidone containing the least amount of trimerized isocyanurate.

It is, therefore, an object of the invention to provide a thermosetting resinous composition capable of resulting in a high quality plastic having polyoxazolidone groups by the reaction of polyepoxide and polyisocyanate.

Another object of the invention is to provide a method for forming a cured coating of the resin crosslinked with oxazolidone ring bridge by using a coating composition consisting essentially of polyepoxide and polyisocyanate, with the least affect of moisture in surrounding air.

A further object of the invention is to provide a method for forming a molded product mainly composed of the resins crosslinked with oxazolidone ring bridge, containing the least amount of trimerized isocyanurate, by reacting polyepoxide and polyisocyanate under mild conditions.

SUMMARY OF THE INVENTION

According to the invention, the abovementioned objects can be attained with the following:

1. A thermosetting resinous composition which consists essentially of
   (A) at least one polyepoxide compound having 2 to 6 epoxide groups,
   (B) at least one polyisocyanate compound having 2 to 6 isocyanate or blocked isocyanate groups, and
   (C) at least one catalyst selected from the group consisting of complex of organotinhalide with onium salt, complex of organotinhalide with hexamethylphosphoramide, complex of stibonium salt with zinc halide and complex of lithium halide with hexamethylphosphoramide, the equivalent ratio of isocyanate group and epoxide group being 1:2 to 2:1.

2. A composition according to item 1 wherein said (B) is the polyisocyanate compound having 2 to 6 blocked isocyanate groups and the composition is formulated as one liquid type composition containing (A), (B) and (C).

3. A method for forming a cured coating which comprises applying onto a substrate surface a composition of item 2 and subjecting thus formed coating to curing at an elevated temperature of 40° to 180° C.

4. A composition according to item 1 wherein said (B) is the mixture of 90 to 10% in terms of isocyanate group ratio of aromatic polyisocyanate compound and 10 to 90% of aliphatic or alicyclic polyisocyanate compound and the composition is formulated as a three pack composition, each pack containing (A), (B) or (C) separately.

5. A composition according to item 1 wherein said (B) is the mixture of 90 to 10% in terms of isocyanate group ratio of aromatic polyisocyanate compound and 10 to 90% of aliphatic or alicyclic polyisocyanate compound and the composition is formulated as a two pack composition, one pack containing (A) and the other pack (B), and (C) is contained in either one of said two packs.

6. A composition according to item 1 wherein said (B) is the mixture of 90 to 10% in terms of isocyanate group ratio of aromatic polyisocyanate compound and 10 to 90% of aliphatic or alicyclic polyisocyanate compound and the composition is formulated as a two pack composition, one pack containing (A) and the other pack (B), and (C) is divided into two complex-forming components and each component is contained in each separate pack abovementioned.

7. A method for preparing a heat resisting molded product which comprises placing the composition of item 4 in a mold and reacting (A) and (B) at a room temperature or an elevated temperature of up to 150° C.

8. A method for preparing a heat resisting molded product which comprises placing the composition of item 5 in a mold and reacting (A) and (B) at a room temperature or an elevated temperature of up to 150° C.

9. A method for preparing a heat resisting molded product which comprises placing the composition of item 6 in a mold and reacting (A) and (B) at a room temperature or an elevated temperature of up to 150° C.

In this invention, any of the known polyisocyanate compounds for polyurethane resins may be satisfactorily used providing they have 2 to 6 isocyanate groups. They may be of aliphatic, alicyclic or aromatic nature.

Examples are hexamethylene diisocyanate, hydrogenated diphenylmethane diisocyanate, isophorone diisocyanate, hydrogenated tolylene diisocyanate, tolylenediisocyanate, diphenylmethanediisocyanate, naphthylene diisocyanate, xylylene diisocyanate, polyisocyanates containing carbodiimide group, urethoimine group, urea bonding, allophanate bonding, biuret bonding or isocyanurate ring structure, and polyisocyanates previously reacted with active hydrogen containing compounds.

In an application for coating use, the present composition is preferably formulated into one pack, liquid type composition and therefore, such polyisocyanate should preferably be blocked with a heat dissociation compound. Examples of such compounds are, as disclosed in Progress in Organic Coatings Vol.3, p. 73 (1975), alcohols, phenols, lactams, N-hydroxyimideoxims, imidazoles, triazoles, active methylene compounds (e.g. acetylacetone, diethyl malonate and the like), aromatic sec. amines, acid sodium sulfite and the like.

In an application for molding use, the polyisocyanate component is preferably used in the form of a mixture of 90 to 10% in terms of isocyanate group ratio of aromatic polyisocyanate compound and 10 to 90% of aliphatic or alicyclic polyisocyanate compound from the standpoint of quality. As the other component of polyepoxide compound, any of the known members having 2 to 6, more preferably 2 to 4, epoxy groups may satisfactorily be used. They may also be of aliphatic, alicyclic or aromatic nature and even of heterocyclic nature.

Examples of such polyepoxide compounds are diglycidyl ethers of bisphenol A derived from the reaction between bisphenol A or halogenized bisphenol A and epihalohydrin, bisphenol F digycidylether, polynuclear phenol glycidylether, epoxidophenyl novolak resin, aromatic glycidyl amine resin derived from aromatic amine and epichlorohydrin, glycidylesters of aromatic, aliphatic or alicyclic polycarboxylic acids, glycidylethers of reaction products of aromatic or alicyclic dicarboxylic acid and polyol, epoxidized cycloolefin, epoxidized derivatives of polyunsaturated compounds such as vegetable oils and their modified products, epoxidized silicate compounds and the like. They may be used alone or in combination of two or more.

The abovementioned polyisocyanate (including blocked ones) and polyepoxide are used in the weight ratio so as to give the equivalent ratio of isocyanate (or blocked isocyanate) to epoxy groups of 1:2 to 2:1, more preferably 1:1 to 2:1. If the amount of polyisocyanate (or blocked polyisocyanate) is too small, curing reaction will take a longer time and if the said amount is too excessive, there is a tendency that the cured product will become too brittle.

Catalyst component is a compound which will accelerate the oxazolidone ring formation in the reaction between polyepoxide compound and polyisocyanate compound and as the most characteristic feature of this invention, the following catalyst is advantageously and selectively used:

(1) complex of organotin halide and hexamethylphosphoramide,
(2) complex of organotin halide and onium salt, or
(3) complex of stibonium salt and zinc halide.

The abovementioned organotin halides are preferably such members represented by the formula:

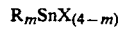

$$R_m SnX_{(4-m)}$$

in which X is a halogen (such as Br, I), m is an integer of 1 to 3 and R is an aliphatic, aromatic or alicyclic hydrocarbon residue. Examples are trimethyl tin iodide, trimethyl tin bromide, dimethyl tin diiodide, dimethyl tin dibromide, tripropyl tin iodide, tripropyl tin bromide, dipropyl tin diiodide, dipropyl tin dibromide, tributyl tin iodide, tributyl tin bromide, dibutyl tin diiodide, dibutyl tin dibromide, trioctyl tin iodide, trioctyl tin bromide, dioctyl tin diiodide, dioctyl tin dibromide, triphenyl tin iodide, triphenyl tin bromide, diphenyl tin diiodide, diphenyl tin dibromide, tricyclohexyl tin iodide, tricyclohexyl tin bromide, dicyclohexyl tin diiodide, dicyclohexyl tin dibromide and the like.

The onium salts are ammonium, phosphonium or stibonium salts represented by the formula:

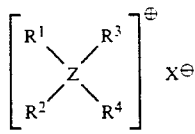

in which Z is N, P or Sb atom, $R^1$ to $R^4$ are the same or different organic group and X is a halogen atom. Examples of onium salts are such ammonium compounds as tetramethyl ammonium iodide, tetramethyl ammonium bromide, tetraethyl ammonium iodide, tetraethyl ammonium bromide, tetrapropyl ammonium iodide, tetrapropyl ammonium bromide, tetrabutyl ammonium iodide, tetrabutyl ammonium bromide, tetraisoamyl ammonium iodide, tetraisoamyl ammonium bromide, tetrabenzyl ammonium iodide, tetrabenzyl ammonium bromide, methyltriethyl ammonium iodide, methyltriethyl ammonium bromide, trimethylphenyl ammonium iodide, trimethylphenyl ammonium bromide, trimethylbenzyl ammonium iodide, trimethyl benzyl ammonium bromide and the like, such phosphonium compounds as tetrabutyl phosphonium iodide, tetrabutyl phosphonium bromide, tetraphenyl phosphonium iodide, tetraphenyl phosphonium bromide, butyltriphenyl phosphonium iodide, butyltriphenyl phosphonium bromide, methyltriphenyl phosphonium iodide, methyltriphenyl phosphonium bromide, tributylphenyl phosphonium iodide, tributylphenyl phosphonium bromide and the like, and such stibonium compounds as tetraphenyl antimony iodide, tetraphenyl antimony bromide, tetrabenzyl antimony iodide, tetrabenzyl antimony bromide, tetrabutyl antimony iodide, tetrabutyl antimony bromide and the like.

In this invention complexes of these catalytic components are selectively used as heat activation catalysts and such complexes are advantageously prepared by reacting the constituting catalytic components, preferably at equivalent molar ratio, in the presence or absence of solvent, at room temperature to 150° C. However, if required, abovementioned polyepoxide or polyisocyanate per se may be used as solvent for the catalytic components and at a heat-curing stage, they may be reacted together to generate the required heat activation catalyst and make it function as effective catalyst. Therefore, the term "heat activation catalyst" as used herein shall denote not only the abovementioned complex itself but also the combination of the constituting catalytic components of such catalyst.

More specifically, in the case of a coating composition, abovementioned polyepoxide, blocked polyisocyanate and catalyst (complex or combination of catalytic components) may be combined together to make one liquid, thermosetting type composition. For molding use, the present composition may be formulated into either one of the following:

(1) a three pack formulation wherein the constituting elements of polyepoxide, polyisocyanate and heat activation catalyst each is contained in a different pack.

(2) a two pack formulation wherein the polyepoxide is contained in one pack and polyisocyanate in another pack, and said catalyst is in either one of said two packs.

(3) a two pack formulation wherein the polyepoxide is contained in one pack and polyisocyanate in another pack, and on member of the complex forming components is in said one pack and the other member is in said another pack.

Among them, for a better storage stability of the composition, (1) or (3) and especially (3) is highly recommended.

For example, in the case of organotin series complex catalyst, organotin halide is preferably contained in polyisocyanate component and the other member of hexamethylphosphoramide or stibonium salt is in polyepoxide component, and in the case of complex of zinc halide and stibonium salt, zinc halide is preferably contained in polyepoxide component and stibonium salt is in polyisocyanate component.

In the present invention, the abovementioned catalyst is used in an amount of 0.01 to 10 weight parts, preferably 0.1 to 5 weight parts, per 100 parts of the mixture of polyepoxide and polyisocyanate. If desired, other catalyst may be used together.

In one liquid type coating composition, besides the abovesaid essential components, any of the conventional additives used in a thermosetting type coating composition such as, for example, filler, reinforcing filament, antioxidant, flame retardant, pigment, surfactant, catalyst, surface conditioner and the like may be added. The present coating composition is very stable at room temperatures and is excellent in application characteristics. The said composition may be applied in a usual way on various substrates and baked at about 40° to 180° C. to give a coating with excellent heat resistance, composed mainly of polyoxazolidone resin, with least amounts of trimerized isocyanurate and epoxy resin.

In the molding type composition, besides the abovementioned essential components, the composition may include other additives such as filler, reinforcing filament, antioxidant, flame retardant, pigment, surfactant, catalyst, mold releasing agent, forming agent and the like.

The compounding ratio of polyepoxide and polyisocyanate may be widely varied depending on the intended objects, and the characteristic properties of thus obtained polyoxazolidone resin may also be varied with said compounding ratio.

When excess amounts (than theoretical amounts) of polyisocyanate component are used, a polymer having oxazolidone bondings in its main chain and isocyanate groups at the end portions (i.e. isocyanate-ended oxazolidone polymer precursor) may be obtained, and when excess amounts of polyepoxide are used, a polymer having oxazolidone bondings in its main chain and epoxy groups at the end portion (i.e. epoxy-ended oxazolidone polymer precursor) may be obtained. From the equivalent amounts of polyepoxide and polyisocyanate components, there is obtained a high molecular weight polyoxazolidone polymer.

The abovementioned isocyanate-ended oxazolidone polymer precursor may be used for the preparation of polyurethane or polyurea products, according to the known technique, such as wax, elastomer, foam, coating material, adhesive and the like. Epoxide-ended oxazolidone polymer precursor may be reacted with epoxy hardening material to give coating material, adhesive and the like. Said oxazolidone polymer is useful for the preparation of molding products, coating material, adhesive and the like. Such materials are likewise useful for impregnation purpose in various electric insulating materials, glass fiber reinforced laminate and the like, and for compounding purpose in the preparation of printed circuits and various other electric appliances.

Particularly important and useful application is the production of aircraft and automobile parts having improved heat resistance and stress resistance.

The oxazolidone forming reaction of the present resinous composition in such applications may be carried out at room temperatures or elevated temperatures up to 150° C. Though the optimum temperature may somewhat be varied with the polyepoxide and polyisocyanate used, it is usually in a range of about 40° to 150° C., more preferably 60° to 120° C. For the preparation of a product with far improved properties, thus obtained polyoxazolidone resin may preferably be subjected to a post curing at an elevated temperature of 100° to 300° C., most preferably 120° to 200° C. The present oxazolidone forming reaction may be carried out in the presence of appropriate diluent or solvent as desired. As the diluent or solvent, any of the inert aromatic, ester, or halogenated solvents amy be satisfactorily used. Said reaction may be carried out batchwise or in a continuous way. In the molding operation, any of the conventional techniques such as vaccum deforming molding, reaction injection molding and the like may be satisfactorily used.

The invention shall be now more fully explained in the following Examples. Unless otherwise stated, all parts and % are by weight.

EXAMPLE 1

22.5 g (0.05 mole) of phenol blocked derivative of diphenylmethane diisocyanate (MDI) were dispersed in 100 ml of o-dichlorobenzene/xylene (1/1) mixture and to this, were added 17.5 g of bisphenol A/ epichlorohydrin epoxy resin having an epoxy equivalent of 175 and the indicated amounts of catalyst shown in Table 1 and the mixture was stirred well to obtain a dispersion composition. This composition was coated on a tin plate so as to give a dry film thickness of about 20 μ and baked under the conditions shown in Table 1 to obtain a cured coating. By the infra-red absorption spectrum analysis, it was confirmed that epoxy group (910 cm$^{-1}$) and carbonyl group in carbamate bonding (1720 cm$^{-1}$) disappeared, oxazolidone group (1750 cm$^{-1}$) was newly formed and isocyanurate group (1705 cm$^{-1}$) which was the trimerized isocyanate group was not found in the product.

EXAMPLES 2 TO 4

In each Experiment, the same procedures as stated in Example 1 were repeated excepting substituting the catalyst shown in Table 1 for that of Example 1, to obtain the cured coating, respectively. In each Example, the infra-red spectrum analysis of the coating showed that there was indeed the formation of oxazolidone group but no formation of trimerized isocyanurate.

COMPARATIVE EXAMPLE 1

The same procedures as stated in Example 1 were repeated excepting using no catalyst. At that time, under the conditions shown in Example 1, no cured coating was obtained. By the infra-red spectrum analysis of the product, it was confirmed that there was no formation of oxazolidone group, isocyanate groups (2260 cm$^{-1}$) and epoxy group remained, and at 170° C., there was clear formation of trimerized isocyanurate.

COMPARATIVE EXAMPLES 2 TO 5

In each Experiment, 14.5 g of low viscosity polyisocyanate compound based on diphenylmethane diisocyanate containing 29% NCO groups, 17.5 g of bisphenol A/epichlorohydrin epoxy resin having an epoxy equivalent of 175 and the indicated amounts of catalyst shown in Table 2 were added to 50 ml of butyl acetate/xylene (1/1) mixed solvent and the combined was stirred well to obtain a dispersion composition.

Using the abovementioned composition and following the procedures of Example 1, a cured coating was prepared and subjected to an infra-red spectrum analysis. In each case, there were no consumption of epoxy groups, no substantial decrease in isocyanate groups and no formation of oxazolidone group. There was clear indication of the formation of isocyanurate by the trimerization of isocyanate groups.

TABLE 1

| | | catalyst | amount (g) | curing conditions temp. (°C.) | curing conditions time (min.) | Evaluation of curing properties curing | Infra-red spectrum analysis (structural charact.)* NCO gp. | OX gp. | CAR gp. | IN gp. | EP gp. |
|---|---|---|---|---|---|---|---|---|---|---|---|
| Example | 1 | Me$_2$SnI$_2$/Ph$_4$SbI | 0.40/0.55 | 130 | 60 | good | — | main | — | — | — |
| | | | | 150 | 30 | good | — | main | — | — | — |
| | | | | 170 | 20 | good | — | main | — | — | — |
| | 2 | Me$_2$SnI$_2$/(Me$_2$N)$_3$P | 0.40/0.20 | 150 | 60 | good | slight | main | — | — | — |
| | | | | 170 | 30 | good | — | main | — | — | — |
| | 3 | Ph$_4$SbI/ZnI$_2$ | 0.55/0.20 | 130 | 60 | good | — | main | — | — | — |
| | | | | 150 | 30 | good | — | main | — | — | — |
| | 4 | LiBr/(Me$_2$N)$_3$PO | 0.18/0.36 | 150 | 60 | good | — | main | — | — | — |

*NCO gp = isocyanate group (2260 cm$^{-1}$)
OX gp = oxazolidone group (1750 cm$^{-1}$)
CAR gp = carbonium group (1720 cm$^{-1}$) in carbamate bonding
IN gp = isocyanurate group (1705 cm$^{-1}$)
EP gp = epoxy group (910 cm$^{-1}$)

TABLE 2

| | | catalyst | amount (g) | curing conditions temp. (°C.) | curing conditions time (min.) | Evaluation of curing properties curing | Infra-red spectrum analysis (structural charact.)* NCO gp. | OX gp. | CAR gp. | IN gp. | EP gp. |
|---|---|---|---|---|---|---|---|---|---|---|---|
| Comp. Ex. | 2 | Me$_2$SnI$_2$/Ph$_4$SbI | 0.40/0.55 | 120 | 60 | shrink | slight | slight | — | many | yes |

TABLE 2-continued

| | catalyst | amount (g) | curing conditions temp. (°C.) | curing conditions time (min.) | Evaluation of curing properties curing | Infra-red spectrum analysis (structural charact.)* NCO gp. | OX gp. | CAR gp. | IN gp. | EP gp. |
|---|---|---|---|---|---|---|---|---|---|---|
| 3 | Ph₄SbI/ZnI₂ | 0.55/0.40 | 120 | 60 | shrink | slight | slight | — | many | yes |
| 4 | LiBr/(Me₂N)₃PO | 0.18/0.36 | 120 | 60 | shrink | slight | slight | — | many | yes |
| 5 | 2-ethyl-4-methyl imidazole | 0.18 | 120 | 60 | shrink | slight | slight | — | many | yes |

EXAMPLE 5

Into a 100 ml flask containing 38.5 g of dichloromethane, were added 16.5 g of dimethyltin diiodide (Me₂SnI₂) and 22.0 g of tetraphenyl antimony iodide (Ph₄SbI) and the combined was stirred at room temperature for about 1 hour to prepare a catalyst solution.

Into a 50ml flask, 3.5g of bisphenol A/epichlorohydrin epoxy resin having an epoxy equivalent of 175 and 0.19 g of the abovementioned catalyst solution were placed and stirred while removing the contained gas. To this, were added 2.32 g of low viscosity polyisocyanate compound based on diphenylmethane diisocyanate containing 29% NCO groups and 0.444 g of isophoronediisocyanate at room temperature and stirred while removing gas. Thus obtained resinous mixture was heated at 80° C. for 1 hour to obtain a hard polymer. Upon analysis by infra-red spectrum, it was confirmed that spectrum peaks corresponding to epoxy groups (910 cm⁻¹) and isocyanate groups (2250 cm⁻¹) had disappeared and there was a clear indication showing the formation of oxazolidone group (1750 cm⁻¹) and only slight indication showing the formation of trimerized isocyanate group (i.e. isocyanurate) (1705 cm⁻¹).

Next, into a mold, on whose inner surface Rimrikey B-659-2 (trademark, Chukyo Yushi, wax series mold releasing agent) was previously coated, the abovementioned resinous mixture was injected, heat-reacted at 80° C. for 1 hour and then taken out to obtain a molded product having excellent heat resistant property.

EXAMPLE 6

Into a 50 ml flask, 3.5 g of bisphenol A/epichlorohydrin epoxy resin having an epoxy equivalent of 175 and 0.38 g of the catalyst solution obtained in Example 1 were placed and stirred while removing the contained gas. To this, were added 1.45 g of low viscosity polyisocyanate compound based on diphenylmethane diisocyanate containing 29% NCO groups and 1.11 g of isophoroneiisocyanate at room temperature and stirred while removing gas. Thus obtained resinous mixture was heated at 80° C. for 1 hour to obtain a hard polymer. Upon analysis by infra-red spectrum, it was confirmed that spectrum peaks corresponding to epoxy groups (910 cm⁻¹) and isocyanate groups (2250 cm⁻¹) had disappeared and there was a clear indication showing the formation of oxazolidone group (1750 cm⁻¹) and substantially no indication showing the formation of trimerized isocyanate group (i.e. isocyanurate) (1705 cm⁻¹).

EXAMPLE 7

Into a 100 ml flask containing 23.6 g of dichloromethane, were added 16.5 g of dimethyltin diiodide (Me₂SnI₂) and 7.1 g of hexamethylphosphoramide ((Me₂N)₃PO) and the combined was stirred at room temperature for about 1 hour to prepare a catalyst solution.

Into a 50 ml flask, 3.5 g of bisphenol A/epichlorohydrin epoxy resin having an epoxy equivalent of 175 and 0.238 g of the abovementioned catalyst solution were placed and stirred while removing the contained gas. To this, were added 2.32 g of low viscosity polyisocyanate compound based on diphenylmethane diisocyanate containing 29% NCO groups and 0.444 g of isophoronediisocyanate at room temperature and stirred while removing gas. Thus obtained resinous mixture was heated at 80° C. for 1 hour to obtain a hard polymer. Upon analysis by infra-red spectrum, it was confirmed that spectrum peaks corresponding to epoxy groups (910 cm⁻¹) and isocyanate groups (2250 cm⁻¹) had disappeared and there was a clear indication showing the formation of oxazolidone group (1750 cm⁻¹) and substantially no indication showing the formation of trimerized isocyanate group (i.e. isocyanurate) (1705 cm⁻¹).

EXAMPLE 8

Into a 20 ml flask, were added 3.5 g of bisphenol A/epichlorohydrin epoxy resin having an epoxy equivalent of 175 and an acetone solution containing 0.033 g of zinc diiodide (ZnI₂) and 0.05 g of tetraphenyl antimony iodide (Ph₄SbI) and the mixture was stirred while removing the contained gas. To this, were added 2.32 g of low viscosity polyisocyanate compound based on diphenylmethane diisocyanate containing 29% NCO groups and 0.444 g of isophoronediiisocyanate at room temperature and stirred while removing gas. Thus obtained resinous mixture was heated at 80° C. for 1 hour to obtain a hard polymer. Upon analysis by infra-red spectrum, it was confirmed that spectrum peaks corresponding to epoxy groups (910 cm⁻¹) and isocyanate groups (2250 cm⁻¹) had disappeared and there was a clear indication showing the formation of oxazolidone group (1750cm⁻¹) and substantially no indication showing the formation of trimerized isocyanate group (i.e. isocyanurate) (1705 cm⁻¹).

EXAMPLE 9

Into a 50 ml flask, 3.5 g of epoxido phenyl novolak resin having an epoxy equivalent of 175 and 0.38 g of the catalyst solution obtained in Example 5 were placed and stirred while removing the contained gas. To this, were added 2.32 g of low viscosity polyisocyanate compound based on diphenylmethane diisocyanate containing 29% NCO groups and 0.444 g of isophoronediiisocyanate at room temperature and stirred while removing gas. Thus obtained resinous mixture was heated at 80° C. for 1 hour to obtain a hard polymer. Upon analysis by infra-red spectrum, it was confirmed that spectrum peaks corresponding to epoxy groups (910 cm⁻¹) and isocyanate groups (2250 cm⁻¹)

had disappeared and there was a clear indication showing the formation of oxazolidone group (1750 cm$^{-1}$) and only slight indication showing the formation of trimerized isocyanate group (i.e. isocyanurate) (1705 cm$^{-1}$).

EXAMPLE 10

Into a 50 ml flask, 3.5 g of epoxido phenyl novolak resin having an epoxy equivalent of 175 and 0.38 g of the catalyst solution obtained in Example 5 were placed and stirred while removing the contained gas. To this, were added 1.45 g of low viscosity polyisocyanate compound based on diphenylmethane diisocyanate containing 28% NCO groups and 1.11 g of isophoronediisocyanate at room temperature and stirred while removing gas. Thus obtained resinous mixture was heated at 80° C. for 1 hour to obtain a hard polymer. Upon analysis by infra-red spectrum, it was confirmed that spectrum peaks corresponding to epoxy groups (910 cm$^{-1}$) and isocyanate groups (2250 cm$^{-1}$) had disappeared and there was a clear indication showing the formation of oxazolidone group (1750 cm$^{-1}$) and substantially no indication showing the formation of trimerized isocyanate group (i.e. isocyanurate) (1750 cm$^{-1}$).

EXAMPLE 11

1.58 g of tetraphenyl antimony iodide (Ph$_4$SbI) were added to 100 g of bisphenol A/epichlorohydrin epoxy resin having an epoxy equivalent of 175 and the mixture was stirred while removing gas to obtain a polyepoxide component solution. Separately, to a mixed polyisocyanate of 83.4 g of low viscosity polyisocyanate compound based on diphenylmethane diisocyanate containing 29% NCO and 16.6 g of isophoronediisocyanate, were added 1.38 g of dimethyl tin diiodide (Me$_2$SnI$_2$) and the combined was stirred and degassed to obtain a polyisocyanate component solution.

Into a 50 ml flask, were placed 3.55 g of said polyepoxide solution and 2.94 g of said mixed polyisocyanate solution and the combined was stirred at room temperature and degassed. Thus obtained resinous composition was heated at 80° C. for 1 hour to obtain a hard polymer. Upon analysis by infra-red spectrum, it was confirmed that the absorption peaks of epoxy group (910 cm$^{-1}$) and isocyanate group (2250 cm$^{-1}$) had disappeared and there was a clear indication showing the formation of oxazolidone group (1750 cm$^{-1}$) and substantially no indication showing the formation of isocyanurate (1705 cm$^{-1}$).

The abovesaid polyepoxide component solution and polyisocyanate component solution each showed an excellent storage stability.

EXAMPLE 12

2.0 g of hexamethyl phosphoramide ((Me$_2$N)$_3$PO) were added to 100 g of bisphenol A/epichlorohydrin epoxy resin having an epoxy equivalent of 175 and the mixture was stirred while removing gas to obtain a polyepoxide component solution. Into a 50 ml flask, were placed 3.57 g of said polyepoxide solution and 3.06 g of the abovementioned organotin halide containing mixed polyisocyanate solution obtained in Example 11 and the mixture was stirred at room temperature and degassed.

Thus obtained resinous composition was heated at 80° C. for 1 hour to obtain a hard polymer. Upon analysis by infra-red spectrum, it was confirmed that the absorption peaks of epoxy group (910 cm$^{-1}$) and isocyanate group (2250 cm$^{-1}$) had disappeared and there was a clear indication showing the formation of oxazolidone group (1750 cm$^{-1}$) and substantially no indication showing the formation of isocyanurate (1705 cm$^{-1}$).

The abovesaid polyepoxide component solution showed an excellent storage stability.

EXAMPLE 13

3.6 g of 25% zinc diiodide acetone solution were added to 100 g of bisphenol A/epichlorohydrin epoxy resin having an epoxy equivalent of 175 and the mixture was stirred while removing gas to obtain a polyepoxide component solution. Separately, to a mixed polyisocyanate of 83.4 g of low viscosity polyisocyanate compound based on diphenylmethane diisocyanate containing 29% NCO and 16.6 g of isophoronediisocyanate, were added 1.9 g of tetraphenyl antimony iodide (Ph$_4$SbI) and the combined was stirred and degassed to obtain a polyisocyanate component solution. Into a 50 ml flask, were placed 3.53 g of said polyepoxide solution and 2.95 g of said mixed polyisocyanate solution and the combined was stirred at room temperature and degassed. Thus obtained resinous composition was heated at 80° C. for 1 hour to obtain a hard polymer. Upon analysis by infra-red spectrum, it was confirmed that the absorption peaks of epoxy group (910 cm$^{-1}$) and isocyanate group (2250 cm$^{-1}$) had disappeared and there was a clear indication showing the formation of oxazolidone group (1750 cm$^{-1}$) and substantially no indication showing the formation of isocyanurate (1705 cm$^{-1}$).

The abovesaid polyepoxide component solution and polyisocyanate component solution each showed an excellent storage stability.

COMPARATIVE EXAMPLE 6

Into a 50 ml flask, 3.5 g of bisphenol A/epichlorohydrin epoxy resin having an epoxy equivalent of 175 and 0.38 g of the catalyst solution obtained in Example 5 were placed and stirred while removing the contained gas. To this, were added 2.9 g of low viscosity polyisocyanate compound based on diphenylmethane diisocyanate containing 29% NCO at room temperature and stirred while removing gas. Thus obtained resinous mixture was heated at 80° C. for 1 hour to obtain a polymer. Upon analysis by infra-red spectrum, it was confirmed that spectrum peaks corresponding to epoxy groups (910 cm$^{-1}$) and isocyanate groups (2250 cm$^{-1}$) had disappeared and there was a clear indication showing the formation of oxazolidone group (1750 cm$^{-1}$) and substantially no indication showing the formation of trimerized isocyanate group (i.e. isocyanurate) (1705 cm$^{-1}$).

However, there was brown colored scorching and coating appearance was no good.

COMPARATIVE EXAMPLES 7 TO 10

Experiments similar to Comparative Example 6 were repeated excepting substituting the catalysts shown in Table 3 for the catalyst of Comparative Example 6. Upon analysis by infra-red spectrum, it was confirmed that in each product, there was indeed the formation of polyoxazolidone but each product always included a larger amount of isocyanurate, too.

TABLE 3

| Comp. Ex. | catalyst | amount (g) | curing state |
|---|---|---|---|
| 7 | Me$_2$SnI$_2$/Ph$_4$SbI | 0.02/0.03 | good |
| 8 | Me$_2$SnI$_2$/(Me$_2$N)$_3$PO | 0.04/0.07 | good |

TABLE 3-continued

| Comp. Ex. | catalyst | amount (g) | curing state |
|---|---|---|---|
| 9 | Ph$_4$SbI/ZnI$_2$ | 0.05/0.03 | scorching |
| 10 | LiBr/(Me$_2$N)$_3$PO | 0.02/0.07 | scorching |

I claim:

1. A thermosetting resinous composition which consists essentially of
    (A) at least one polyepoxide compound having 2 to 6 epoxide groups,
    (B) at least one polyisocyanate compound having 2 to 6 isocyanate or blocked isocyanate groups, and
    (C) at least one catalyst selected from the group consisting of a complex of an organotinhalide with an onium salt, a complex of an organotinhalide with hexamethylphosphoramide, and a complex of a stibonium salt with a zinc halide, the polyepoxide compound and polyisocyanate compound being reacted in an
    equivalent ratio of isocyanate groups to epoxide groups 1:2 to 2:1 to from a polyoxazolidone resin.

2. A composition according to claim 1 wherein said (B) is the polyisocyanate compound having 2 to 6 blocked isocyanate groups and the composition is formulated as a one liquid type composition containing (A), (B) and (C).

* * * * *